US006664320B1

(12) United States Patent
Cai et al.

(10) Patent No.: US 6,664,320 B1
(45) Date of Patent: Dec. 16, 2003

(54) USING SOLVENTLESS METAL OLEATE IN MAKING METAL MASTERBATCH

(75) Inventors: Gangfeng Cai, Danville, CA (US); Ta Yen Ching, Novato, CA (US); Brad D. Rodgers, Orange, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 09/510,013

(22) Filed: Feb. 22, 2000

(51) Int. Cl.[7] .................................................. C08K 5/04
(52) U.S. Cl. ......................................... 524/394; 524/398
(58) Field of Search ................................... 524/394, 398

(56) References Cited

U.S. PATENT DOCUMENTS

| | | | |
|---|---|---|---|
| 3,454,510 A | * 7/1969 | Newland | 260/23 |
| 3,497,571 A | 2/1970 | Tellier er al. | 260/844 |
| 3,536,687 A | 10/1970 | Nordstrom | 260/89.5 |
| 4,396,730 A | * 8/1983 | Imahashi | 523/200 |
| 4,415,710 A | 11/1983 | Barnabeo et al. | 525/370 |
| 4,524,201 A | 6/1985 | Barnabeo et al. | 528/395 |
| 4,775,593 A | * 10/1988 | Heberger | 428/411.1 |
| 5,116,916 A | 5/1992 | Young | 525/350 |
| 5,211,875 A | 5/1993 | Speer et al. | 252/188.28 |
| 5,306,760 A | * 4/1994 | Sullivan | 524/400 |
| 5,346,644 A | 9/1994 | Speer et al. | 252/188.28 |
| 5,425,896 A | 6/1995 | Speer et al. | 252/188.28 |
| 5,466,756 A | 11/1995 | Roach et al. | 525/330.6 |
| 5,498,364 A | 3/1996 | Speer et al. | 252/188.28 |
| 5,627,239 A | 5/1997 | Ching et al. | 525/330.6 |
| 5,641,825 A | 6/1997 | Bacskai et al. | 524/398 |
| 5,656,692 A | 8/1997 | Hayes | 525/63 |
| 5,660,761 A | 8/1997 | Katsumoto et al. | 252/188.28 |
| 5,700,554 A | 12/1997 | Speer et al. | 428/220 |
| 5,736,616 A | 4/1998 | Ching et al. | 525/330.3 |
| 5,776,361 A | 7/1998 | Katsumoto et al. | 252/188.28 |
| 5,811,027 A | 9/1998 | Speer et al. | 252/188.28 |
| 5,837,158 A | 11/1998 | Shepodd et al. | 252/181.6 |
| 5,859,145 A | 1/1999 | Ching et al. | 525/330.6 |
| 5,955,524 A | * 9/1999 | Azuma et al. | 524/178 |
| 6,057,013 A | 5/2000 | Ching et al. | 428/35.7 |
| 6,063,307 A | 5/2000 | Shepodd et al. | 252/181.6 |
| 6,313,193 B1 | * 11/2001 | Simendinger | 523/122 |

FOREIGN PATENT DOCUMENTS

| | | |
|---|---|---|
| JP | 56136347 | 10/1981 |
| JP | 62177067 | 8/1987 |
| WO | WO96/40799 | 12/1996 |
| WO | WO97/32722 | 9/1997 |
| WO | WO98/06779 | 2/1998 |
| WO | WO98/51758 | 11/1998 |
| WO | WO99/38914 | 8/1999 |
| WO | WO99/48963 | 9/1999 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1–8 (Chicago, Jun. 19–20, 2000).

Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19–20, 2000).

PCT/US01/02034 Search Report (Jun. 5, 2001).

* cited by examiner

*Primary Examiner*—Edward J. Cain
(74) *Attorney, Agent, or Firm*—Williams, Morgan & Amerson, P.C.

(57) ABSTRACT

Herein are disclosed metal oleate, especially cobalt oleate, masterbatch compositions useful in preparing oxygen scavenging packaging articles, as well as methods of making the masterbatch compositions.

In one embodiment, the masterbatch comprises porous beads comprising a first polymer; the metal oleate dispersed in the porous beads; and a second polymer a photoinitiator, in powder form, dispersed on the exteriors of the porous beads.

In another embodiment, the masterbatch comprises a metal oleate and a polymer, wherein the metal oleate is in the form of pellets or, a powder, and the polymer is in thug form of a powder dispersed on the exteriors of the pellets or powder.

In yet another embodiment, the masterbatch comprises a metal oleate and a polymer, wherein the metal oleate and the polymer are compounded.

In still another embodiment the masterbatch is prepared from a composition comprising a metal oleate and a polymer, wherein the polymer is in the form of a container and the metal oleate is contained within the container.

9 Claims, 1 Drawing Sheet

O₂ Scavenging by Headspace Analysis

USING SOLVENTLESS METAL OLEATE IN MAKING METAL MASTERBATCH

BACKGROUND OF THE INVENTION

1. Field of the Invention

The present invention relates generally to the field of manufacture of oxygen-scavenging packaging materials. Particularly, it concerns the preparation of masterbatches of metal oleate, especially cobalt oleate, that avoid handling and processing problems found in previous preparative techniques.

2. Description of Related Art

It is well known that limiting the exposure of oxygen-sensitive products to oxygen maintains and enhances the quality and shelf-life of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and restocking. In the food packaging industry, several means for limiting oxygen exposure have already been developed, including modified atmosphere packaging (MAP), vacuum packaging and oxygen barrier film packaging. In the first two instances, reduced oxygen environments are employed in the packaging, while in the latter instance, oxygen is physically prevented from entering the packaging environment.

Another, more recent, technique for limiting oxygen exposure involves incorporating an oxygen scavenger into the packaging structure. Incorporation of a scavenger in the package can scavenge oxygen present inside the package. The oxygen thus scavenged either can be present in the interior when product is filled into the package, or can migrate into the package after product is filled. In addition, such incorporation can provide a means of intercepting and scavenging oxygen as it passes through the walls of the package (herein referred to as an "active oxygen barrier"), thereby maintaining the lowest possible oxygen level throughout the package.

In many cases, however, the onset of oxygen scavenging in this system may not occur for days or weeks. The delay before the onset of useful oxygen scavenging is hereinafter referred to as the induction period. In addition, the rate of oxygen scavenging may also be relatively low. Much work has been done both to minimize the induction period and increase the scavenging rate. One common approach that is useful in both areas is the use of metal oleates, such as cobalt oleate, as a catalyst for oxygen scavenging.

Typically, in production of an oxygen scavenging packaging article, metal oleate is provided as part of a masterbatch with a polymer, i.e. the metal oleate is in a concentrated formulation that is added to the bulk polymer during production to generate a desired, lower concentration of the metal in the oxygen scavenging layer of the oxygen scavenging packaging article. However, metal oleates pose a number of difficulties in processing.

Neat metal oleates, such as cobalt oleate, are tacky solids at room temperature. As a result, they have tar-like properties and are difficult to handle, as pellets of metal oleate will adhere upon storage. Typically, to overcome this limitation, a metal oleate used in masterbatch production is usually provided in an organic solvent, such as in a 50% solution in toluene. This raises the price over that of, for example, a neat formulation of a metal stearate (a non-tacky solid at room temperature). Also, the organic solvent such as toluene must be removed during production of the masterbatch, requiring further equipment, and poses disposal concerns, especially for toluene, which is widely held to be carcinogenic.

Therefore, it is desirable to formulate a metal oleate masterbatch using a stock of metal oleate that can be readily handled in solid form. It is also desirable for such a stock to be free or substantially free of toluene or other solvent.

SUMMARY OF THE INVENTION

The present invention is directed to metal oleate masterbatch compositions useful in preparing oxygen scavenging packaging articles, as well as methods of making the masterbatch compositions.

In one embodiment, the masterbatch composition comprises porous beads comprising a first polymer; metal oleate dispersed in the porous beads; and a second polymer or a photoinitiator, in powder form, dispersed on the exteriors of the porous beads. Such a masterbatch composition can be prepared by a method comprising (i) providing a solution of metal oleate in an organic solvent; (ii) dispersing the solution into the beads, to form solvated metal oleate beads; (iii) evaporating the solvent from the solvated metal oleate beads, to form metal oleate dispersed in the beads; and (iv) mixing the polymer or the photoinitiator, in powder form, with the beads, to form the composition.

In another embodiment, the masterbatch composition comprises a metal oleate and a polymer, wherein the metal oleate is in the form of pellets, and the polymer is in the form of a powder dispersed on the exteriors of the pellets. Such a masterbatch composition can be prepared by a method comprising (i) providing the metal oleate in the form of pellets, and (ii) dispersing the polymer in the form of a powder on the exteriors of the pellets.

In yet another embodiment, the masterbatch composition comprises a metal oleate and a polymer, wherein the metal oleate and the polymer are compounded. Such a masterbatch can be prepared by a method comprising (i) providing the metal oleate in the form of pellets and providing the polymer as a solid and (ii) compounding the metal oleate and the polymer.

In still another embodiment, the masterbatch composition is prepared from a composition comprising a metal oleate and a polymer, wherein the polymer is in the form of a container, such as a bag, and the metal oleate is contained within the container. The composition is processed to form a masterbatch, or directly into an oxygen scavenging component of an oxygen scavenging packaging article, by the method of (i) providing the composition comprising a metal oleate and a polymer, wherein at least some of the polymer is in the form of a container and the metal oleate is contained within the container, (ii) melting the composition to produce a melted composition, and (iii) mixing the melted composition to produce a masterbatch. If the metal oleate in the container is congealed during or before the providing step, the method further comprises grinding the composition, before or during the heating step.

DESCRIPTION OF ILLUSTRATIVE EMBODIMENTS

Figure 1:
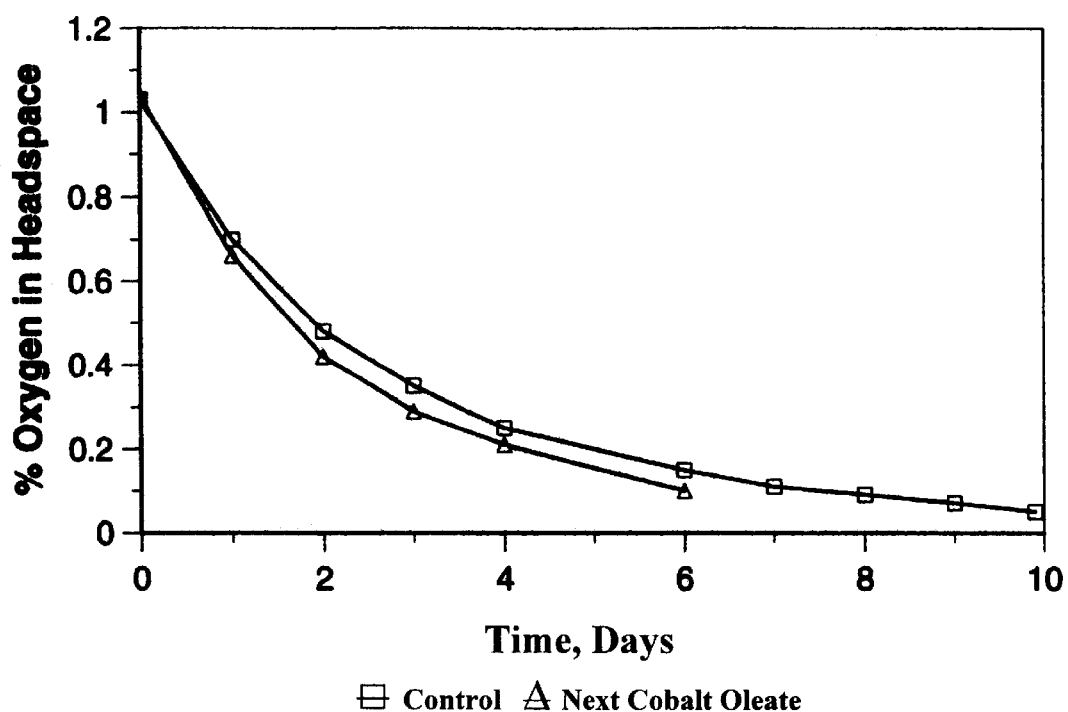
FIG. 1 shows the percent of oxygen remaining as a function of time in the headspace of two films, one made with a cobalt oleate masterbatch composition according to the present invention, and a control made with a conventional cobalt oleate 50% solution in toluene masterbatch, in an experiment described in Example 2.

Throughout this description, the terms "pellet" and "powder" each refer to a solid formulation of a compound or composition. Both forms consist of discrete particles of the compound or composition. A pellet is herein defined as being a particle of at least 1 mm in the largest dimension, with a powder comprising particles of less than 1 mm in the largest dimension. One of skill in the art will recognize that this definition is arbitrary. A "bead," as used herein, is synonymous with "pellet."

In one embodiment, the present invention relates to a composition, comprising porous beads comprising a first polymer; a metal oleate dispersed in the porous beads; and a second polymer or a photoinitiator, in powder form, dispersed on the exteriors of the porous beads. Such a composition is useful as a masterbatch of the metal in further production of an oxygen scavenging layer of an oxygen scavenging packaging article. The masterbatch composition is substantially non-tacky and can be readily handled.

The metal ion in the metal oleate can be any metal suitable for use as an oxygen scavenging catalyst in an oxygen scavenging packaging article. Preferably, the metal is a transition metal. More preferably, the transition metal is selected from the first, second or third transition series of the Periodic Table. Suitable metals include, but are not limited to, manganese, iron, cobalt, nickel, copper, rhodium, and ruthenium. Preferably, the transition metal is selected from copper, manganese, and cobalt; most preferably, the transition metal is cobalt.

The metal oleate can be provided from any source, either purchased as such or made up from the metal and oleic acid. By "oleate" is meant any composition comprising at least about 5%, preferably at least about 25%, more preferably at least about 50%, most preferably at least about 70%, oleic acid. The remainder is typically made up of $C_1$–$C_{18}$ acids, such as stearate, palmitolic, or neodecanoic, among others.

A typical oleic acid grade comprises 73% oleic acid, 8% linoleic acid, 7% palmitolic acid, 3% myristolic acid, and 1% linolinic acid. The remainder is made up of inert materials. Preferably, a low linolinic grade oleic acid (which may be referred to as "LL oleic acid") is used. By "low linolinic grade oleic acid" or "LL oleic acid" is meant an oleic acid grade comprising less than about 1%, preferably less than about 0. 1%, more preferably less than about 0.01%, linolinic acid. For example, an LL oleic acid that can be used in the present invention comprises 74% oleic acid, 4% linoleic acid, 11% palmitolic acid, 3% myristolic acid, and a trace (<0.1%) linolinic acid.

An oxygen scavenging packaging article comprising a metal oleate made with LL oleic acid imparts less of an off-taste or malodor to packaged food or beverage than does such an article comprising the metal oleate made with typical oleic acid grade. Though not to be bound by theory, it is believed, when oxygen scavenging occurs, the metal oleate made with LL oleic acid gives rise to fewer odorous $C_5$–$C_{10}$ fragments than that made with a typical oleic acid grade. Also, a neat metal oleate made with LL oleic acid has higher softening and melting points than that made with a typical oleic acid grade, which has advantages in processing as will be described below.

If the metal oleate is prepared from a solution, such as a 50% solution in toluene, preferably the solvent is substantially removed during preparation of the masterbatch composition, and is substantially absent from the masterbatch composition. The metal oleate is present in the masterbatch from about 5% to about 40%, preferably from about 20% to about 25%, metal oleate by weight of the composition.

By "first polymer" is meant a polymer that is capable of forming porous beads and is acceptable for use in an oxygen scavenging packaging article. Because the masterbatch composition will typically be further combined with an oxygen scavenging polymer (and, optionally, a non-oxygen scavenging polymer, e.g. polyethylene) to form an oxygen scavenging layer of an oxygen scavenging packaging article, the first polymer should be chosen so as to not interfere with blending of the masterbatch with oxygen scavenging polymer and any other additives.

By "oxygen scavenging polymer" is meant an oxidizable organic compound that, upon oxidation, substantially does not yield fragments that are capable of migrating out of the masterbatch composition, or an oxygen scavenging layer formulated from the masterbatch composition.

The oxygen scavenging polymer is a hydrocarbon with a polymeric backbone. The hydrocarbon can be saturated or unsaturated, and substituted or unsubstituted. Examples of such hydrocarbons include, but are not limited to, diene polymers such as polyisoprene, polybutadiene (especially 1,2-polybutadienes, which are defined as those polybutadienes possessing greater than or equal to 50% 1,2 microstructure), and copolymers thereof, e.g. styrenebutadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containinling more than one carbon-carbon double bond (conjugated or non-conjugated). These hydrocarbons further include carotenoids such as β-carotene.

Examples of substituted hydrocarbons include, but are not limited to, those with oxygen-containing moieties, such as esters, carboxylic acids, aldehydes, ethers, ketones, alcohols, peroxides, or hydroperoxides. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates.

Preferably, the oxygen scavenging polymer comprises a polymeric backbone and cyclic olefinic pendant groups.

More preferably, the polymeric backbone is ethylenic. The polymeric backbone can comprise monomers of ethylene or styrene.

More preferably, the cyclic olefinic pendant group comprises the structure (I):

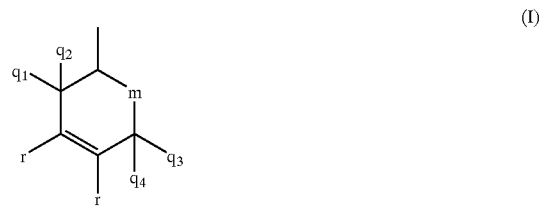

(I)

wherein $q_1$, $q_2$, $q_3$, $q_4$, and r are independently selected from hydrogen, methyl, or ethyl; m is $-(CH_2)_n-$, wherein n is an integer from 0 to 4, inclusive; and, when r is hydrogen, at least one of $q_1$, $q_2$, $q_3$, and $q_4$ is also hydrogen.

More preferably, the oxygen scavenging polymer further comprises linking groups linking the backbone with the pendant groups. Most preferably, the linking groups are selected from:

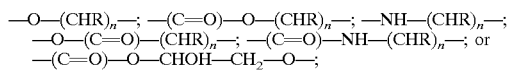

wherein R is hydrogen, methyl, ethyl, propyl, or butyl; and n is an integer from 1 to 12, inclusive.

A most preferred oxygen scavenging polymer is ethylene/methyl acrylate/cyclohexenyl methyl acrylate terpolymer (EMCM). EMCM can be readily made following the teachings of copending U.S. patent application Ser. No. 09/127,316, incorporated herein by reference.

The first polymer can also be an oxygen scavenging polymer, but it need not be. If the first polymer is not an oxygen scavenging polymer, it may be more stable on storage in air. If the first polymer is an oxygen scavenging polymer, it may offer greater convenience (e.g. no further blending will be required in processing) and a lesser thermal history. The skilled artisan will be able to choose an appropriate polymer for use as the first polymer based on these parameters, the intended use of a product made from the masterbatch, and other variables.

Preferably, the first polymer is ethylene/vinyl acetate copolymer (EVA), ethylene/methyl acrylate copolymer (EMAC), ethylene/butyl acrylate copolymer (EBAC), or polyethylene (PE). More preferably, the polymer is PE. Polyethylene has been found to be compatible with essentially all oxygen scavenging polymers. Porous beads of polyethylene are commercially available from Montell.

The porous beads, described above as comprising the first polymer, may instead comprise a mixture of two or more first polymers as described above.

In the composition comprising a metal oleate dispersed in the porous beads, the amount of the porous beads may range from about 30% to about 90%, preferably from about 50% to about 75%, by weight of the composition.

After the metal oleate is dispersed into the porous beads, the exteriors of the porous beads are coated with a powder of a second polymer or a photoinitiator.

The second polymer, if used, has the same requirements as the first polymer, except that it need not be capable of formation into porous beads. The second polymer can be the same as the first polymer, or different.

In a preferred embodiment, the second polymer is ethylene/vinyl acetate copolymer (EVA), ethylene/methyl acrylate copolymer (EMAC), ethylene/butyl acrylate copolymer (EBAC), or polyethylene (PE).

If a photoinitiator is used, suitable photoinitiators are well known to those skilled in the art. Specific examples include, but are not limited to, benzophenone, o-methoxybenzophenone, acetophenone, o-methoxyacetophenone, acenaphthenequinone, methyl ethyl ketone, valerophenone, hexanophenone, a-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, (x-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis (dimethylamino)-benzophenone, 1'-acetonaphthone, 2'-acetonaphthone, acetonaphthone and 2,3-butanedione, benz[a]anthracene -7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl]propanone].

Use of a photoinitiator is preferable because it generally provides faster and more efficient initiation. However, due to the high cost of photoinitiators, it is desirable to use the minimum amount of photoinitiator required to initiate oxygen scavenging. This minimum amount will vary depending on the photoinitiator used, the wavelength and intensity of ultraviolet light used to initiate, and other factors. Preferably, the photoinitiator is either on the U.S. Food and Drug Administration GRAS (generally regarded as safe) list, or exhibits substantially no migration from the oxygen scavenging packaging article to the product (i.e. less than 50 ppb in the product).

Photoinitiators that are especially useful in the present invention include benzophenone derivatives containing at least two benzophenone moieties, as described in copending U.S. patent application Ser. No. 08/857,325, filed May 16, 1997. These compounds act as effective photoinitiators to initiate oxygen scavenging activity in oxygen scavenging compositions. Such benzophenone derivatives have a very low degree of extraction from oxygen scavenging compositions, which may lead to reduced contamination of a packaged product by extracted photoinitiator.

A "benzophenone moiety" is a substituted or unsubstituted benzophenone group. Suitable substituents include alkyl, aryl, alkoxy, phenoxy, and alicyclic groups containing from 1 to 24 carbon atoms or halides.

The benzophenone derivatives include dimers, trimers, tetramers, and oligomers of benzophenones and substituted benzophenones.

The benzophenone photoinitiators are represented by the formula:

$$X_m(Y)_n$$

wherein X is a bridging group selected from sulfur; oxygen; carbonyl; —$SiR_2$—, wherein each R is individually selected from alkyl groups containing from 1 to 12 carbon atoms, aryl groups containing 6 to 12 carbon atoms, or alkoxy groups containing from 1 to 12 carbon atoms; —NR'—, wherein R' is an alkyl group containing 1 to 12 carbon atoms, an aryl group containing 6 to 12 carbon atoms, or hydrogen; or an organic group containing from 1 to 50 carbon atoms, preferably from 1 to 40 carbon atoms; m is an integer from 0 to 11; Y is a substituted or unsubstituted benzophenone group; and n is an integer from 2 to 12.

X can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as an ether, ketone, ester, or alcohol.

The substituents of Y, herein R", when present, are individually selected from alkyl, aryl, alkoxy, phenoxy, or alicyclic groups containing from 1 to 24 carbon atoms, or halides. Each benzophenone moiety can have from 0 to 9 substituents.

Preferably, the combined molecular weight of the X and R" groups is at least about 30 g/mole. Substituents can be selected to render the photoinitiator more compatible with the masterbatch composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

When a photoinitiator is used, its primary function in the final oxygen scavenging packaging article is to enhance and facilitate the initiation of oxygen scavenging upon exposure to radiation. The amount of photoinitiator can vary. In many instances, the amount will depend on the oxidizable resin used, the wavelength and intensity of electromagnetic radiation used, the nature and amount of antioxidants used, as well as the type of photoinitiator used. The amount of photoinitiator also depends on how the masterbatch will be used. For instance, if the masterbatch will be formulated into a film layer placed, in an oxygen scavenging packaging article, underneath a layer which is somewhat opaque to the radiation used for initiation, more photoinitiator may be needed.

Regardless of whether a second polymer or a photoinitiator is used, the concentration of the second polymer or the photoinitiator in the masterbatch will typically be from about 1% to about 30%, preferably from about 5% to about 20%, by weight of the masterbatch.

The masterbatch can also comprise additional compounds, such as antioxidants, fillers, plasticizers, or anti-fog agents, among others. Appropriate additives will depend on the intended use of an oxygen scavenging packaging article comprising an oxygen scavenging layer made with the masterbatch. Selection of appropriate additives and the decision to include them in the masterbatch instead of another component of the oxygen scavenging layer or the oxygen scavenging packaging article is a routine matter for the skilled artisan.

The present invention also relates to a method of making the above masterbatch. The method comprises (i) providing a solution of a metal oleate in toluene or another organic solvent; (ii) dispersing the solution into the beads, to form solvated metal oleate beads; (iii) evaporating toluene from the solvated metal oleate beads, to form the metal oleate dispersed in the beads; and (iv) mixing the polymer or the photoinitiator, in powder form, with the beads, to form the composition.

The solution of the metal oleate in toluene or another organic solvent is typically commercially available as a 50% solution, but a solution with any concentration of the metal oleate can be used, provided the solution can readily be dispersed into the beads.

Optionally, the porous beads can be treated with vacuum before performing the dispersing step. This vacuum treatment aids the subsequent dispersion of the metal oleate solution into the porous beads.

The dispersing step involves mixing of the metal oleate solution and the porous beads. The mixing can be performed by addition of the metal oleate solution into the porous beads, or by addition of the porous beads into the metal oleate solution. In either case, stirring or agitation can be used. The metal oleate solution will disperse through the beads. Typically, about 2 parts (vol) of the metal oleate solution are added to about 3 parts (vol) of porous polyethylene beads. After dispersion of the metal oleate solution into the porous beads, the resulting solvated metal oleate beads are ready for removal of the toluene or other organic solvent. However, the solvated metal oleate beads are stable for at least 24 hr, preferably at least 7 days, and can be stored without further processing during this time.

The organic solvent is removed from the solvated metal oleate beads by evaporation. Typically, the evaporation is performed under nitrogen. The toluene or other organic solvent can then be scrubbed from the nitrogen and further processed for disposal or recycling. The result of evaporation is a dispersion of the metal oleate in the porous beads. The storage stability of the product after the evaporation step is typically less than 24 hr, and preferably, the dispersion of the metal oleate in the porous beads is further processed substantially immediately after evaporation is complete.

After removal of the organic solvent from the composition, a second polymer or a photoinitiator are added as a powder and dispersed over the exteriors of the beads. The second polymer or the photoinitiator are as described above. A mixture of two or more second polymers, two or more photoinitiators, or a combination of one or more second polymer and one or more photoinitiator, can also be used.

Techniques of dispersion of the powder over the exteriors of the beads are known in the art. Any such technique may be used, provided it is capable of leading to complete coating of the exteriors of the beads in a reasonably short length of time.

The concentration of the powder to be added should be sufficient to completely coat the exteriors of the beads. Typically, about 0.25 parts to about 1 part (vol) of the powder are added.

Optionally, other compounds may be added to the masterbatch, either in solution with the metal oleate, as a component of the porous beads, with the powder of the second polymer or the photoinitiator, or some combination. The other compounds can include antioxidants, fillers, plasticizers, or anti-fog agents, among others. Appropriate additives will depend on the intended use of an oxygen scavenging packaging article comprising an oxygen scavenging layer made with the masterbatch. Selection of appropriate additives and the decision to include them in the masterbatch instead of another component of the oxygen scavenging layer or the oxygen scavenging packaging article is a routine matter for the skilled artisan.

After addition and mixing of the powder over the exteriors of the beads, the resulting masterbatch can be used for preparation of an oxygen scavenging polymer composition, or stored for later preparation of an oxygen scavenging polymer composition. The masterbatch so prepared has good storage stability, and can be readily handled without congealing of the metal oleate.

However, the foregoing technique is not preferred, because toluene or another organic solvent is still required in preparation of the masterbatch.

In another embodiment, the present invention is directed to a masterbatch composition, comprising a metal oleate and a polymer, wherein the metal oleate is in the form of pellets or a powder, and the polymer is in the form of a powder dispersed on the exteriors of the pellets.

The metal oleate is as described above. The metal ion in the metal oleate can be any metal suitable for use as an oxygen scavenging catalyst in an oxygen scavenging packaging article. Preferably, the metal is a transition metal. More preferably, the transition metal is selected from the first, second or third transition series of the Periodic Table. Suitable metals include, but are not limited to, manganese, iron, cobalt, nickel, copper, rhodium, and ruthenium; preferably, manganese, copper, or cobalt. Most preferably, the transition metal is cobalt. The oleate component can be either typical oleic acid grade or, preferably, LL oleic acid, as described above. Pellets or a powder of a metal oleate are commercially available or can be readily made up from the metal and the oleate component. Such pellets or powder are substantially pure, e.g. do not comprise toluene or another organic solvent.

The metal oleate is present in the masterbatch from about 5% to about 80%, preferably 5% to about 40%, more preferably from about 10% to about 25%, metal oleate by weight.

The polymer can be any first polymer as described above. Preferably, the polymer is selected from ethylene/vinyl acetate copolymer (EVA), ethylene/butyl acrylate copolymer (EBAC), ethylene/methyl acrylate copolymer (EMAC), or polyethylene (PE). More preferably, the polymer is polyethylene.

The amount of polymer should be high enough to substantially inhibit oleate-mediated congealing of particles of the masterbatch during storage, shipment, or processing. The amount of the polymer in the composition should be sufficient to cover the exteriors of the pellets.

Optionally, the masterbatch can further comprise other compounds. These additives can include photoinitiators, antioxidants, fillers, plasticizers, or anti-fog agents, among others. Appropriate additives will depend on the intended use of an oxygen scavenging packaging article comprising an oxygen scavenging layer made with the masterbatch. Selection of appropriate additives and the decision to include them in the masterbatch instead of another component of the oxygen scavenging layer or the oxygen scavenging packaging article is a routine matter for the skilled artisan.

A preferred additive is a photoinitiator, as described above. Preferred photoinitiators include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, or substituted benzoylated styrene oligomer.

The present invention also relates to a method of preparing this masterbatch composition, wherein the metal oleate is in the form of pellets or a powder, and the polymer is in the form of a powder dispersed on the exteriors of the pellets or the powder. The method comprises (i) providing the metal oleate in the form of pellets or a powder, and (ii) dispersing the polymer in the form of a powder on the exteriors of the metal oleate pellets or powder.

The metal oleate and the polymer are as described above. The metal ion in the metal oleate can be any metal suitable for use as an oxygen scavenging catalyst in an oxygen scavenging packaging article. Preferably, the metal is a transition metal. More preferably, the transition metal is selected from the first, second or third transition series of the Periodic Table. Suitable metals include, but are not limited to, manganese, iron, cobalt, nickel, copper, rhodium, and ruthenium; preferably, manganese, copper, or cobalt. Most preferably, the transition metal is cobalt. The oleate component of the metal oleate can be either typical oleic acid grade or, preferably, LL oleic acid, as described above. Pellets or a powder of the neat metal oleate are commercially available or are readily made up, as are powders of polymers useful in this embodiment of the invention. The powder can also comprise other polymers, as well as other additives, such as photoinitiators or antioxidants, among others, alone or in any combination.

The powder should be added in an amount sufficient to cover the exteriors of the pellets of the metal oleate. The metal oleate and the polymer powder can be mixed using any known technique or apparatus. The result is coated pellets or powder of the metal oleate that will not congeal upon storage, and thus can be readily stored and shipped before final processing into an oxygen scavenging layer of an oxygen scavenging packaging article. This method also has the advantage of not using toluene or another solvent.

In another embodiment, the present invention relates to a masterbatch comprising a metal oleate and a polymer, wherein the metal oleate and the polymer are compounded.

The metal oleate and the polymer are as described above. The metal ion in the metal oleate can be any metal suitable for use as an oxygen scavenging catalyst in an oxygen scavenging packaging article. Preferably, the metal is a transition metal. More preferably, the transition metal is selected from the first, second or third transition series of the Periodic Table. Suitable metals include, but are not limited to, manganese, iron, cobalt, nickel, copper, rhodium, and ruthenium; preferably, manganese, copper, or cobalt. Most preferably, the transition metal is cobalt. The oleate component of the metal oleate can be either typical oleic acid grade or, preferably, LL oleic acid, as described above. The metal oleate and the polymer can be provided as pellets, powders, or both. By "compounded" is meant the metal oleate and the polymer are mixed under sufficient heat to melt or partially melt the metal oleate and the polymer, then extruded, cooled, and pelletized to create a solid mixture of the metal oleate and the polymer. The mixture is homogeneous throughout each pellet.

The metal oleate is present in the masterbatch from about 5% to about 80%, preferably from about 5% to about 40%, more preferably from about 10% to about 25%, metal oleate by weight.

The amount of polymer to be used should be high enough to substantially inhibit oleate-mediated congealing of particles of the masterbatch during storage, shipment, or processing.

The masterbatch of this embodiment can further comprise additives, such as photoinitiators or antioxidants, among others. Preferred photoinitiators include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, or substituted benzoylated styrene oligomer. A more preferred photoinitiator is tribenzoyl triphenylbenzene.

The present invention also relates to a method of making the masterbatch of this embodiment. The method comprises (i) providing the metal oleate in the form of pellets or a powder and providing the polymer as pellets or a powder and (ii) compounding the metal oleate and the polymer.

The solid formulation of the metal oleate was described above, and can be either pellets or a powder. The oleate component of the metal oleate can be either typical oleic acid grade or, preferably, LL oleic acid, as described above. Solid formulations of the polymer are as described above, and can be provided as either pellets or a powder. The amount of polymer to be used should be high enough to substantially inhibit oleate-mediated congealing of particles of the compounded end product during subsequent storage, shipment, or processing.

Compounding the metal oleate and the polymer can be performed using any technique and apparatus known in the art. Typically, pellets or a powder of the metal oleate and pellets or a powder of the polymer are mixed and heated to greater than the melting points of the metal oleate and the polymer to produce a melt. The melt is then extruded, whereupon it undergoes cooling. The cooling or cooled melt can then be pelletized, powdered, or otherwise processed into a solid. The compounded solid, whether as pellets, powders, or another form, can be stored without subsequent congealing of the metal oleate and can readily be stored, shipped, or processed in making an oxygen scavenging layer useful in an oxygen scavenging packaging article.

The two embodiments most recently discussed have the advantage of yielding a masterbatch whose component particles are substantially non-tacky. These embodiments also have the advantage of not using toluene or another organic solvent, and thus use a less-expensive stock of metal oleate and avoid disposal concerns posed by the use of organic solvents. However, these embodiments require the stock of a neat metal oleate to be provided as substantially non-congealed, i.e. present as relatively free-flowing pellets or a powder.

In another embodiment, the present invention is directed to a composition comprising a metal oleate and a polymer, wherein at least some of the polymer is in the form of a container and the metal oleate is contained within the container.

The metal oleate is a neat metal oleate, as described above, and can be either pellets or a powder. The metal ion in the metal oleate can be any metal suitable for use as an oxygen scavenging catalyst in an oxygen scavenging packaging article. Preferably, the metal is a transition metal. More preferably, the transition metal is selected from the first, second or third transition series of the Periodic Table. Suitable metals include, but are not limited to, manganese, iron, cobalt, nickel, copper, rhodium, and ruthenium; preferably, manganese, copper, or cobalt. Most preferably, the transition metal is cobalt. The oleate component of the metal oleate can be either typical oleic acid grade or, preferably, LL oleic acid, as described above.

The polymer can be any polymer capable of forming a container, compatible with processing into a masterbatch, and compatible with end-use in or adjacent to an oxygen-scavenging layer of an oxygen scavenging packaging article. Preferably, the polymer is selected from ethylene/vinyl acetate copolymer (EVA), ethylene/butyl acrylate copolymer (EBAC), ethylene/methyl acrylate copolymer (EMAC), or polyethylene (PE).

The container can be any structure capable of packaging the metal oleate, typically in quantities of about 10 to about 50 pounds. The container can be rigid or flexible, preferably flexible. The flexible container may be referred to as a "bag." The container can be formulated with additives in addition to the polymer; the additives can be photoinitiators, antioxidants, or other compounds as described above. Typically, the container will comprise at least about 90%, possibly at least about 95% or even at least about 99%, the polymer, with the remainder being additives.

Typically, the amount of the metal oleate in the container will be about 10 pounds to about 50 pounds, and the weight of the container itself will be about 0.1 pounds to about 5 pounds.

The neat metal oleate in the container will, upon storage, tend to congeal, the particles of the metal oleate adhering to both other metal oleate particles and the container. Such congealing is not a deficiency, as will be discussed below.

In a related embodiment, the present invention is directed to a method of generating a masterbatch. The method comprises (i) providing the composition comprising the metal oleate and a polymer, wherein the polymer is in the form of a container and the metal oleate is contained within the container, (ii) melting the composition to produce a melted composition, and (iii) mixing the melted composition to produce a masterbatch. If the metal oleate in the container is congealed during or before the providing step, the method further comprises grinding the composition, before or during the heating step.

The container, the metal oleate, and the polymer are as described above. Congealing of the metal oleate in the container is acceptable, as will be described below.

"Grinding" is defined as the generation of small fragments of the metal oleate, the container, or both from the metal oleate in the container. Grinding will disrupt any congealing of the metal oleate, and also serves to mix the metal oleate with the polymer and any other additives formed in the container. Grinding can be performed using any appropriate means for generating small fragments of a solid or semisolid mass. Examples of such means include cutting teeth, grinding slabs, or any other known apparatus or combination of apparatus that can generate small fragments of the metal oleate, the container, or both. One such apparatus that is useful for grinding, as well as other steps of the method, is a Brabender extruder, equipped with a rotor comprising cutting teeth at the mouth of the hopper.

The composition, either as provided or after grinding, if performed, is heated to greater than the melting points of both the metal oleate and the polymer. Preferably, if ground, the composition is heated soon after grinding is complete. For example, in the Brabender extruder, the ground composition is formed at the mouth of the hopper, and immediately falls into the heating vessel of the extruder.

Heating the composition can be accomplished by any appropriate technique. Preferably, while heating is taking place, the composition is being mixed, to homogenize the melt resulting from grinding.

In addition to the metal oleate, the polymer, and the additives, if any, provided by the composition, the operator can add other compounds, such as photoinitiators, antioxidants, a greater amount of the polymer, or another polymer, during the heating step. Such additives are as described for alternative embodiments above. Preferably, the temperature of heating is to a temperature greater than the melting points of any compounds added in this step. However, the temperature need not be high enough to melt one or more of the added compounds if the concentration of the non-melted added compound or compounds is low, mixing is vigorous, and melting of the non-melted added compound or compounds is not necessary to their later activity in the production or use of an oxygen scavenging packaging article.

The end product of the heating step is a melt comprising the metal oleate and the polymer, as well as any optional additives. The melt is preferably homogeneous.

The melt is then mixed, which can be performed using any appropriate apparatus known in the art. The mixed melt can then be cooled and formed into a desired structure. The form into which the mixed melt is formed, e.g. as pellets, a powder, a single layer film, a layer of a multilayer film, a single layer rigid packaging article, or a layer of a multilayer rigid packaging article, among others, is not crucial. Preferably, the melt is formed as pellets, as pellets are most suitable for use as a metal masterbatch in production of an oxygen scavenging packaging article.

Preferably, the form into which the mixed melt is formed is substantially non-tacky, despite the presence of the metal oleate.

It is also possible to form the mixed melt directly into an oxygen scavenging packaging article, for example, as a metal oleate catalytic layer adjacent to an oxygen scavenging layer in the oxygen scavenging article.

This method has numerous advantages in making a metal masterbatch comprising a metal oleate. The final masterbatch can be readily stored without congealing of the metal oleate in the masterbatch. No solvent such as toluene was used during preparation of the masterbatch. In addition, there is no deficiency if the neat metal oleate pellets entered into the process have congealed, because the metal oleate and the polymer can be ground during the performance of the method.

In a further embodiment, the present invention relates to a method of making an oxygen scavenging packaging article. The method comprises (i) providing a masterbatch comprising a metal oleate and a polymer, wherein the masterbatch is substantially free of organic solvent; (ii) combining the masterbatch with a polymer composition comprising an oxygen scavenging polymer, under melt conditions, to form a combined composition; and (iii) forming the combined composition into the oxygen scavenging packaging article or a layer thereof.

The masterbatch comprising the metal oleate and the polymer can be in any of the forms, and can be made by any of the methods, described above. The oxygen scavenging polymer is as described above, and is preferably EMCM. Combining the masterbatch with the oxygen scavenging polymer under melt conditions can be performed by techniques known in the art. The combined composition can also comprise other additives such as photoinitiators or antioxidants, among others. Alternatively, additives can be provided in an additional layer of the oxygen scavenging packaging article during the forming step. The forming step can be performed using any techniques known in the art, such as extrusion, coextrusion, or solvent casting, among others. Appropriate forming techniques will depend on the masterbatch formulation, the oxygen scavenging polymer, the intended structure and function of the oxygen scavenging packaging article, and other variables that will be apparent to the skilled artisan.

The oxygen scavenging packaging article can be any such packaging article described above, such as a single- or multilayer film or a single- or multilayer rigid article. Preferably, the oxygen scavenging packaging article is in the form of a film, more preferably a multilayer film.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

PREPARATION OF A MASTERBATCH

A masterbatch comprising cobalt oleate dispersed in porous polyethylene beads was prepared as follows. First, 2 parts by volume of a 50% solution of cobalt oleate in toluene were dispersed into 3 parts of porous polyethylene beads (Montell). Thereafter, the toluene was evaporated under nitrogen to yield dried cobalt oleate beads. Then, 1 part of photoinitiator tribenzoyl triphenylbenzene ($BBP^3$) as powder was added to the dried cobalt oleate beads and mixed well. The resulting powder-coated cobalt oleate beads were non-sticky. The mixture had good storage stability.

EXAMPLE 2

OXYGEN SCAVENGING TEST OF OXYGEN SCAVENGING POLYMER Compounded with Masterbatch made from Neat Cobalt Oleate To make a cobalt masterbatch, 20.6 g of neat cobalt oleate was mixed with 2.0 g of a photoinitiator ($BBP^3$) and 177.4 g of ethylene/methyl acrylate copolymer (EMAC, Chevron) and fed into a Haake twin screw extruder at 220° C. Thereafter, 33 g of masterbatch was blended with 300 g ethylene/methyl acrylate/cyclohexenyl methyl acrylate terpolymer (EMCM, Chevron) on a Haake twin screw extruder at 130° C. The resulting blend was then processed into a 2 mil thick 3-layer film with 0.5 mil polyethylene outer layer and 1 mil EMCM/masterbatch core layer, and the oxygen scavenging properties of the film were then tested.

To initiate oxygen scavenging, a 100 $cm^2$ (5 cm×20 cm) film (0.38 g) was exposed for 1.6 minutes to 254 nm UV at 1 inch to receive 800 $mJ/cm^2$. The oxygen scavenging was tested with 300 cc 1% $O_2$ and 99% $N_2$ at 4° C., using a Mocon HS750. The results of the test are given below in Table 1. These results are plotted in FIG. 1, along with the results obtained from a control 3-layer film containing a masterbatch made from 50 wt. % Co oleate toluene solution. FIG. 1 plots the percent of oxygen remaining in the headspace against time (days). The oxygen scavenging uptake capacity is based on the total weight of the 3-layer film.

TABLE 1

$O_2$ Scavenging Measurements Using Mocon HS750

| Time (Days) | $O_2$ Meas. (Vol %) | $O_2$ Meas. Vol (mL) | Vol- $O_2$ Used (mL) | $O_2$ Uptake (mL/g) | $O_2$ Uptake Avg. Rate ($cc/m^2$/day) | Instant Rate ($cc/m^2$/day) | $O_2$ Capacity ($cc/m^2$/mil) |
|---|---|---|---|---|---|---|---|
| 0.0 | 1.04 | 3.12 | 0.00 | 0.00 | 0.00 | 0.00 | 0.00 |
| 1.0 | 0.66 | 1.95 | 1.12 | 2.73 | 56.05 | 56.05 | 56.05 |
| 2.0 | 0.42 | 1.22 | 1.82 | 4.43 | 45.43 | 34.80 | 90.85 |
| 3.0 | 0.29 | 0.83 | 2.19 | 5.34 | 36.46 | 18.53 | 109.38 |
| 4.0 | 0.21 | 0.59 | 2.41 | 5.88 | 30.14 | 11.20 | 120.58 |
| 6.0 | 0.10 | 0.28 | 2.71 | 6.62 | 22.62 | 7.56 | 135.70 |

In summary, an oxygen scavenging multilayer film comprising a masterbatch according to the present invention, substantially free of organic solvent, effectively scavenged oxygen, to an extent comparable to a control multilayer film comprising a 50% cobalt oleate solution in toluene masterbatch.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method of preparing a masterbatch of a metal oleate, an antioxidant, and a polymer, comprising:

providing the metal oleate, the antioxidant, and the polymer, wherein the polymer is in the form of a container and the metal oleate and the antioxidant are contained within the container;

heating the container containing the metal oleate, to form a melt of the metal oleate, the antioxidant, and the polymer; and mixing the melt, to form a masterbatch of the metal oleate, the antioxidant, and the polymer.

2. The method of claim 1, wherein the metal component of the transition metal oleate is selected from manganese, iron, cobalt, nickel, copper, rhodium, or ruthenium.

3. The method of claim 2, wherein the metal component of the transition metal oleate is cobalt.

4. The method of claim 1, further comprising grinding the container containing the metal oleate and the antioxidant, before or during the heating step.

5. The method of claim 1, wherein the oleate of the transition metal oleate consists essentially of LL oleic acid.

6. The method of claim 1, wherein the polymer is selected from ethylene/vinyl acetate copolymer (EVA), ethylene/methyl acrylate copolymer (EMAC), polyethylene (PE), or mixtures thereof.

7. The method of claim 1, wherein before or during the heating step, a photoinitiator is added.

8. The method of claim 7, wherein the photoinitiator is selected from dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, and substituted benzoylated styrene oligomer.

9. The method of claim 8, wherein the photoinitiator is tribenzoyl triphenylbenzene.

* * * * *